United States Patent Office 2,725,196
Patented Nov. 29, 1955

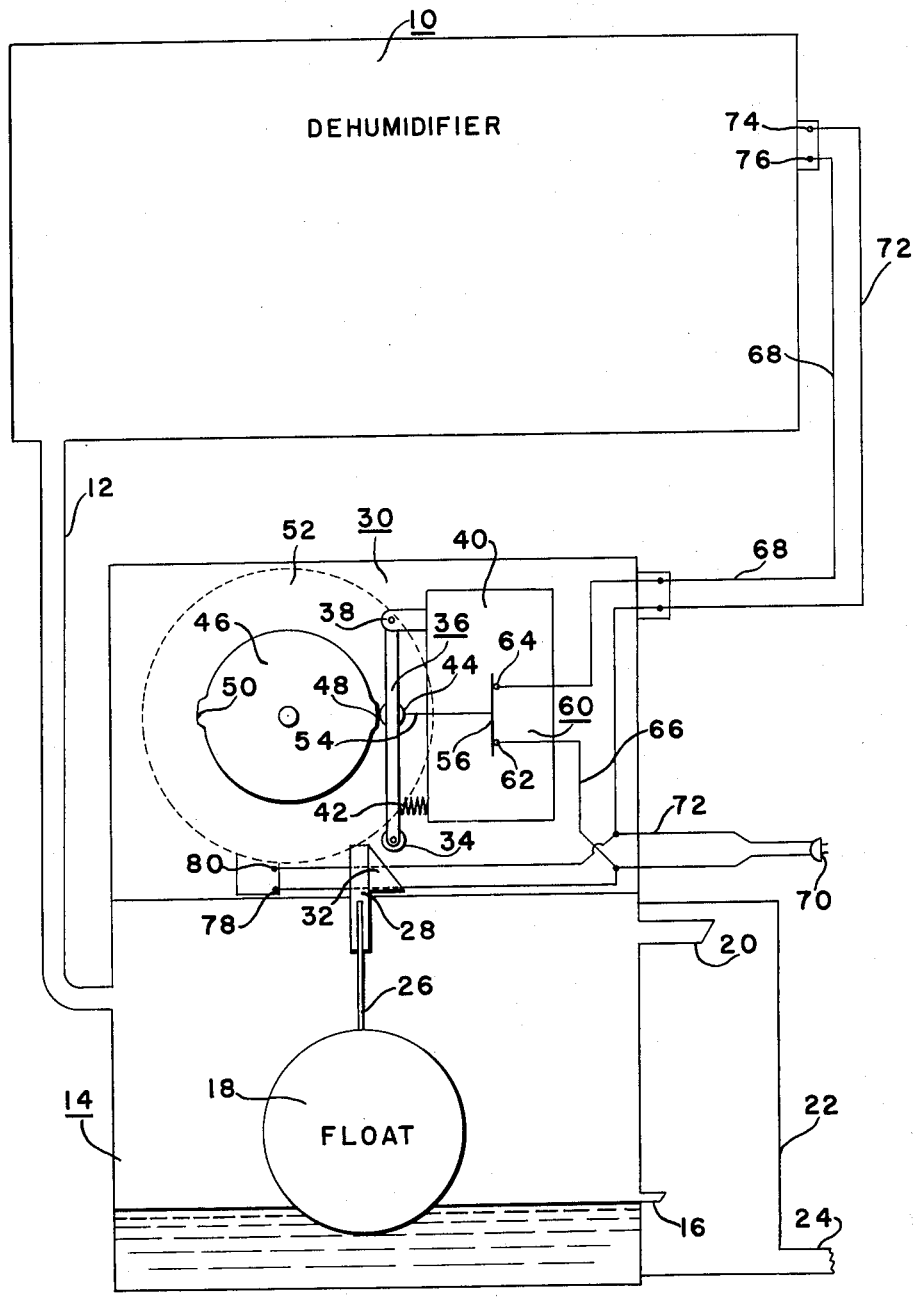

2,725,196

DEHUMIDIFIER CONTROL SYSTEM

Francis F. Trittschuh, Piqua, Ohio, assignor to General Motors Corporation, Detroit, Mich., a corporation of Delaware Application June 7, 1954, Serial No. 434,756

15 Claims. (Cl. 236—44)

This invention pertains to means for controlling dehumidifiers, and particularly to automatic means for controlling the operation of an electrically operated dehumidifier.

Dehumidifiers which operate on a refrigeration principle, i. e. devices including a compressor, a condenser, an expansion valve, and an evaporator in a closed refrigerant system, have become a household necessity for maintaining the atmosphere in basements healthy and livable. However, present day electrically operated dehumidifiers do not incorporate automatic controls of any character, and, hence, their operation must be controlled manually. If the dehumidifier is operated continuously, the consumption of electrical power is unduly increased, while if the dehumidifier is operated intermittently, the atmosphere in the enclosure may become too humid for comfort. This invention relates to economical cycling means for operating a dehumidifier in combination with means for automatically determining whether or not the air in the enclosure contains sufficient moisture to warrant continued operation of the dehumidifier. Accordingly, among my objects are the provision of means for automatically controlling the operation of a dehumidifier in accordance with the moisture content of the air in an enclosure; the further provision of means for automatically operating a dehumidifier at intermittent intervals for predetermined time periods to sense the condition of the air in an enclosure; and the still further provision of a dehumidifier control system including sensing means and means controlled thereby for controlling dehumidifier operation.

The aforementioned and other objects are accomplished in the present invention by incorporating a motor operated cam for actuating a switch which controls the operation of a dehumidifier at periodic intervals for predetermined time periods. Specifically, the chamber surrounding the dehumidifier evaporator upon which moisture condenses during dehumidifier operation, is connected by a conduit to a measuring tank within which a float is disposed. The measuring tank includes a calibrated bleed orifice permitting a predetermined flow of condensate water from the measuring tank to drain. In addition, the measuring tank is also formed with an overflow outlet passage which is connected to drain.

The float disposed within and responsive to the level of water within the measuring tank is operatively connected with a cam for actuating a microswitch which controls energization of the dehumidifier. Thus, during the maintenance of a predetermined level of liquid within the measuring tank, the float positioned cam will actuate the microswitch to maintain energization of the dehumidifier. The microswitch is also operatively associated with a cycling mechanism comprising a timing motor which may be connected through suitable gearing to a cam having one or more rises, or lobes, separated by dwells. In the illustrated embodiment, the cam is arranged to make one revolution every twenty-four hours, and is formed with two diametrically opposed rises which are effective to close the microswitch so as to effect dehumidifier operation for a period of one hour. However, it is to be understood that the time period and interval of cyclic dehumidifier operation is only exemplary and is not to be construed as a limitation.

The dehumidifier control system operates substantially as follows. When the timing motor which rotates the cycling cam positions the cam so that the microswitch follower engages a cam rise, the dehumidifier will be operated for a period of one hour. During this time period, the moisture removed from the air in the enclosure which is condensed on the evaporator will flow to the measuring, or air sampling, tank. Thus, the cyclic operation of the dehumidifier as controlled by the cam may be called sensing means for determining moisture content in the air. If at the end of the hour of dehumidifier operation, the moisture content in the air of the enclosure is of sufficient magnitude, as determined by the design of the measuring tank, the float will seek a level at which the cam positioned thereby will maintain the microswitch closed so as to continue operation of the dehumidifier. In this manner, the dehumidifier will continue to be operated until the moisture content of the air in the enclosure is lowered to a point wherein it is not deemed advisable, as determined by the condensate responsive means, for continuing operation of the dehumidifier. However, if after the one hour cycling, or sample test period, the moisture content of the enclosed air is insufficient, the dehumidifier will be deenergized until the next cycling period occurs, which in the disclosed embodiment is eleven hours later.

Further objects and advantages of the present invention will be apparent from the following description, reference being had to the accompanying drawing wherein a preferred embodiment of the present invention is clearly shown.

In the drawing:

The drawing represents a schematic diagram of the control system of this invention.

With reference to the drawing, a conventional dehumidifier is indicated by the numeral 10, which includes an electrically operated refrigeration system including an evaporator, not shown, upon which moisture condenses during dehumidifier operation. Ordinarily the condensate from the evaporator is discharged into a drain conduit. However, in the present invention, the chamber surrounding the evaporator is connected by a conduit 12 to a measuring, or sampling, tank 14. The measuring tank 14 may be of any desired configuration and is formed with a calibrated bleed orifice 16, which is located a predetermined distance from the bottom thereof. The location of the bleed orifice 16 is such that in the absence of a continuous supply of condensate from the tank 14, the level of condensate within the tank will maintain a float 18 disposed within the tank in the position depicted in the drawing. The tank 14 also includes an overflow orifice, or outlet pipe, 20, which is disposed adjacent the upper surface thereof. The liquid discharged from either the bleed orifice 16 or the overflow orifice 20 is received by a tank 22, which is connected to drain through a conduit 24.

The float, or liquid level responsive member, 18 is operatively connected by an arm 26 to a cam assembly 28, which is disposed in a switch box, designated generally by the numeral 30. The cam assembly includes a substantially triangular cam member 32, which is operatively associated with a cam follower 34 carried by an arm 36, which is pivoted at 38, to a bracket 40 disposed within the switch housing 30. The bracket 40 also has attached thereto one end of a spring 42, the other end of which is attached to the arm 36 for biasing the arm in a clockwise direction about pivot point 38.

The arm 36 is also formed with a second cam follower 44 on an intermediate portion thereof. The cam follower 34 is arranged to cooperate with the inclined surface of cam 32, while the cam follower 44 is arranged to cooperate with a rotary cam 46 having two diametrically opposed lobes, or rises, 48 and 50, which are separated by continuous dwells. Preferably, though not necessarily, the cam 46 is driven through suitable gear reduction mechanism, not shown, by a synchronous type timing motor 52 such that the cam 46 makes one revolution every twenty-four hours. Furthermore, the arcuate distance of the rises 48 and 50 is preferably, though not necessarily, equivalent to the angular distance traversed by the periphery of the cam 46 in one hour.

The arm 36 is operatively connected by a link 54 to a bridging contact 56 of a microswitch, generally depicted by the numeral 60. The microswitch 60 includes spaced contacts 62 and 64, contact 62 being connected to a conductor 66, while contact 64 is connected to a conductor 68. Conductor 66 is connected to one terminal of a receptacle 70, which is connected to any suitable source of alternating current, not shown. The other terminal of the receptacle 70 is connected by a conductor 72 to one terminal 74 of the electrical control mechanism for the dehumidifier 10, while the conductor 68 is connected to the other terminal 76 of the dehumidifier. Conductors 66 and 72 are also connected to terminals 78 and 80 of the timing motor 52. Consequently, the timing motor 52 will be continuously energized from the source of alternating current.

Operation

Operation of the dehumidifier control system is as follows. When the timing motor 52 rotates the cam 46 to the position shown in the drawing wherein the cam rise 48 engages the cam follower 44, the microswitch 60 will be closed thereby energizing the dehumidifier. As alluded to hereinbefore, the dehumidifier 10 will be energized for an interval of one hour, which is the period of time during which the cam rise 48 is in contact with the cam follower 44. During this one hour sensing period, if the moisture in the air of the enclosure in which the dehumidifier is located is sufficiently high, say 50%, the moisture condensed on the evaporator of the dehumidifier will flow through conduit 12 through the sampling tank 14, thereby raising the liquid level therein by supplying more liquid than flows to drain through the calibrated orifice 16. Thus, the float 18 will seek a higher level wherein the cam 32 will engage the follower 34 so that after the elapse of the one hour period controlled by the cycling cam 46, the microswitch 60 will be maintained in a closed position by the cam 32, the follower 34, the arm 36 and link 54.

Thus, the dehumidifier is automatically cycled for a one hour period by the cam 46 so as to sample the air within the enclosure. If the air within the enclosure contains sufficient moisture to warrant continued operation of the dehumidifier, the condensate responsive means comprising the tank 14 and the float 18, together with the orifice 16, will maintain the dehumidifier energized until such time as the air in the enclosure does not contain sufficient moisture to maintain a level in the tank 14, which will position the float 18 so as to keep the microswitch 60 closed.

Similarly, if after the initial cycling period of one hour, as caused by the timing motor 52 and the cam 46, the level of liquid in the tank 14 does not rise to a sufficient height to position the float 18 so as to maintain the microswitch 60 closed, the dehumidifier will be deenergized after the elapse of the one hour cycling period by reason of spring 42 urging the arm 36 in a clockwise direction about pivot 38. Accordingly, for the next eleven hours the dehumidifier will be deenergized, at which time, the aforedescribed sequence of events will be repeated.

It is to be understood that the time periods during which the moisture content of the air in the enclosure is sampled, are only by way of illustration and are not to be construed as limitations. Furthermore, the time interval at which the dehumidifiers are automatically cycled by the timing mechanism, and the reference to 50% moisture in the air of the enclosure, which is required to maintain energization of the dehumidifier after cycling, are only exemplary.

While the embodiment of the present invention as herein disclosed, constitutes a preferred form, it is to be understood that other forms might be adopted.

What is claimed is as follows:

1. A control system for an electrically operated dehumidifier including in combination, means for effecting periodic operation of the dehumidifier for a predetermined time interval, means responsive to the amount of moisture condensation during operation of the dehumidifier for said predetermined time interval, and means controlled by said second recited means for selectively continuing operation of said dehumidifier after the elapse of said predetermined time interval if the amount of condensate is equal to or greater than a predetermined quantity, or discontinuing operation of said dehumidifier after the elapse of said predetermined time interval if the amount of condensate is less than said predetermined quantity.

2. A system for controlling a dehumidifier including in combination, means for periodically effecting operation of said dehumidifier for a predetermined time interval, means responsive to the rate of moisture removal from the air in an enclosure within which said dehumidifier is operating during said time interval, and means controlled by said second recited means for selectively continuing operation of said dehumidifier in accordance with the rate of moisture removal during said predetermined time interval if the rate of moisture removal is equal to or greater than a predetermined amount, or discontinuing the operation of said dehumidifier if the rate of moisture removal is less than said predetermined amount during said predetermined time interval.

3. A control system for a dehumidifier including in combination, means for periodically effecting operation of said dehumidifier for a predetermined time interval, means responsive to the rate of moisture removal from the air in an enclosure within which said dehumidifier is operating during said time interval including, a tank having a calibrated discharge orifice, means connecting said tank with said dehumidifier so that moisture removed from the air is supplied to said tank during said predetermined time interval, and a liquid level responsive member in said tank, and means controlled by said liquid level responsive member for selectively continuing operation of said dehumidifier after the elapse of said predetermined time interval if the rate of moisture removal is equal to or greater than a predetermined amount, or discontinuing the operation of said dehumidifier if the rate of moisture removal is less than said predetermined amount during said predetermined time interval.

4. A control system for a dehumidifier including in combination, timing means for effecting cyclic operation of said dehumidifier for a predetermined time interval, means responsive to the rate of moisture removal from the air in an enclosure within which said dehumidifier is operating during said time interval, and means controlled by said second recited means for selectively continuing operation of said dehumidifier in accordance with the rate of moisture removal during said predetermined time interval if the rate of moisture removal is equal to or greater than a predetermined amount, or discontinuing the operation of said dehumidifier if the rate of moisture removal is less than said predetermined amount during said predetermined time interval.

5. The combination set forth in claim 4 wherein said timing means includes a timing motor and a cam operatively connected thereto and rotated thereby.

6. The combination set forth in claim 4 wherein the means responsive to the rate of moisture removal includes, a tank having a calibrated discharge orifice, means connecting said tank with said dehumidifier so that moisture removed from the air is supplied to said tank during said predetermined time interval, and a liquid level responsive member in said tank.

7. The combination set forth in claim 4 wherein said last recited means comprises, a cam and means controlled by the position of said cam for continuing or discontinuing dehumidifier operation.

8. A control system for an electrically operated dehumidifier including in combination, a switch for controlling operation of said dehumidifier, means for periodically effecting closure of said switch so as to effect operation of said dehumidifier for a predetermined time interval, means responsive to the rate of moisture removal from the air in an enclosure within which said dehumidifier is operating during said time interval, and means controlled by said second recited means for selectively continuing operation of said dehumidifier in accordance with the rate of moisture removal during said predetermined time interval if the rate of moisture removal is equal to or greater than a predetermined amount, or discontinuing the operation of said dehumidifier if the rate of moisture removal is less than said predetermined amount during said predetermined time interval.

9. The combination set forth in claim 8 wherein said first recited means comprises, a timing motor and a cam operatively connected to and rotated thereby.

10. The combination set forth in claim 8 wherein said means responsive to the rate of moisture removal includes, a tank having a calibrated discharge orifice, means connecting said tank with said dehumidifier so that moisture removed from the air is supplied to said tank during said predetermined time interval, and a liquid level responsive member in said tank.

11. The combination set forth in claim 8 wherein said last recited means includes a cam operatively associated with said switch for maintaining the same closed or permitting said switch to open after the elapse of said predetermined time interval.

12. A control system for an electrically operated dehumidifier including in combination, a switch for controlling operation of said dehumidifier, an arm operatively connected with said switch, the position of said arm determining whether said switch is open or closed, means for periodically positioning said arm so as to effect closure of said switch thereby effecting dehumidifier operation for a predetermined time interval, means responsive to the rate of moisture removal from the air in an enclosure within which said dehumidifier is operating during said interval, and means controlled by said second recited means for selectively continuing operation of said dehumidifier in accordance with the rate of moisture removal during said predetermined time interval if the rate of moisture removal is equal to or greater than a predetermined amount, or discontinuing the operation of said dehumidifier if the rate of moisture removal is less than said predetermined amount during said predetermined time interval.

13. The combination set forth in claim 12 wherein said first recited means comprises, a timing motor and a cam operatively connected to and rotated thereby.

14. The combination set forth in claim 12 wherein said means responsive to the rate of moisture removal includes, a tank having a calibrated discharge orifice, means connecting said tank with said dehumidifier so that moisture removed from the air is supplied to said tank during said predetermined time interval, and a liquid level responsive member in said tank.

15. The combination set forth in claim 12 wherein said last recited means includes a cam operatively associated with said arm for maintaining the same in a switch closing position or permitting said switch to open after the elapse of said predetermined time interval.

References Cited in the file of this patent

UNITED STATES PATENTS

| | | |
|---|---|---|
| 1,667,001 | Gray | Apr. 24, 1928 |
| 2,324,164 | Kronmiller | July 13, 1943 |
| 2,438,120 | Freygang | Mar. 23, 1948 |